D. M. HATTON.
PIPE REAMER.
APPLICATION FILED MAY 1, 1911.
1,038,881.
Patented Sept. 17, 1912.
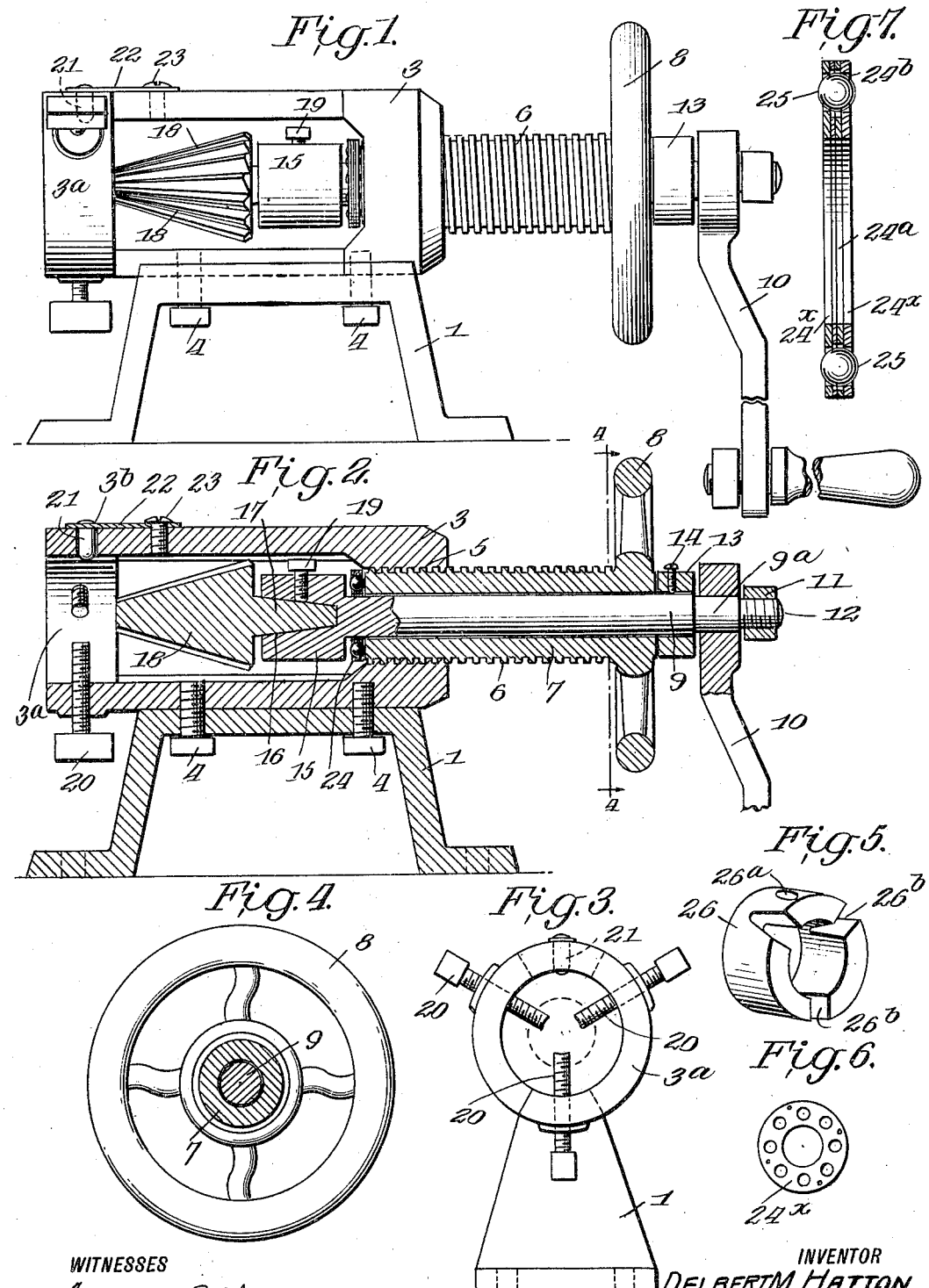
WITNESSES
Samuel E. Wade
L. A. Stanley
INVENTOR
Delbert M. Hatton
BY Munn & Co.
ATTORNEYS

UNITED STATES PATENT OFFICE.

DELBERT M. HATTON, OF BURNETTS CREEK, INDIANA.

PIPE-REAMER.

1,038,881.

Specification of Letters Patent.   Patented Sept. 17, 1912.

Application filed May 1, 1911. Serial No. 624,276.

*To all whom it may concern:*

Be it known that I, DELBERT M. HATTON, a citizen of the United States, and a resident of Burnetts Creek, in the county of White and State of Indiana, have made certain new and useful Improvements in Pipe-Reamers, of which the following is a specification.

My invention relates to improvements in pipe reamers, and it consists in the combinations, constructions and arrangements herein described and claimed.

An object of my invention is to provide a device of a relatively simple nature for reaming pipes in which the power required is reduced to a minimum.

A further object of my invention is to provide a device for reaming pipes of various sizes accurately without leaving a bur.

A further object of my invention is to provide interchangeable pipe holding parts to accommodate pipes of various size, these parts being capable of quick application to or removal from the main supporting frame.

Other objects and advantages will appear in the following specification, and the novel features of the device will be particularly pointed out in the appended claim.

My invention is illustrated in the accompanying drawings forming part of this application in which similar reference characters indicate like parts in the several views and in which—

Figure 1 is a side view showing one embodiment of my invention; Fig. 2 is a central longitudinal section through the device; Fig. 3 is an end view; Fig. 4 is a section along the line 4—4 of Fig. 2 looking in the direction of the arrows; Fig. 5 is a perspective view of one of the detachable collars; Fig. 6 is a face view of one of the washer plates; and Fig. 7 is an enlarged sectional view of the ball bearing washer.

In carrying out my invention I provide a U-shaped base 1 which may be secured to a bench or other suitable support. Carried upon the base 1 is a hollow supporting frame 3 which is secured to the base by means of the screws 4. One end of the hollow frame is threaded at 5 to receive the thread 6 of a hollow sleeve 7 bearing an integral hand-wheel 8. The sleeve 7 is arranged to receive a cylindrical rod 9 which has a reduced portion $9^a$ upon which is the handle 10. A nut 11 is secured to the threaded end 12 of the rod to hold the handle in place. A collar 13 is secured to the rod 9 by means of the set screw 14. The opposite end of the rod 9 extends within the hollow frame 3 and is provided with a head 15 having a tapered socket 16 arranged to receive the tapered shank 17 of the cutting tool 18. A set screw 19 holds the tool in place. At the end of the frame 3 is an integral ring $3^a$ bearing the screws 20 which project toward the center and which are for the purpose of centering the pipe to be reamed. The ring $3^a$ is provided with an opening arranged to receive a pin 21 carried by spring 22 which is secured by a screw 23 to the frame.

In order to reduce the friction I interpose a ball bearing washer like that shown at 24 between the head 15 and the sleeve 7. This washer is best shown in Fig. 7. It consists of an intermediate plate or plates $24^a$ having a series of openings $24^b$ for the reception of balls 25, which are held in place by the outer plates $24^x$ in the manner shown in Fig. 7. The plates $24^x$ and $24^a$ are secured together. A face view of the plates $24^x$ is shown in Fig. 6.

From the foregoing description of the various parts of the device the operation thereof may be readily understood. The pipe to be reamed is introduced into the ring $3^a$ and is centered by means of the screws 20. The cutter is fed forward by turning the hand-wheel 8 until the beveled edges of the cutter contact with the interior of the pipe. The handle 10 is now turned and the cutting or reaming takes place. By turning the hand wheel 8 the cutter is fed forwardly. The thrust of the tool is taken up by the ball-bearing washer 24 thereby reducing the power necessary to operate the tool to a minimum. Where a small pipe is to be reamed a collar such as that shown in Fig. 5 at 26, may be placed within the ring $3^a$. This collar has an opening $26^a$ into which the spring pin 21 fits. The radial slots $26^b$ straddle the screws 20 so that the latter may bear on the pipe. The collar is kept from turning by the engagement of the sides of the screws 20 with the collar.

It will be seen that I have provided a device which is simple in its nature and yet which is strong and durable. Different sized collars, such as 26, may be instantly applied or detached from the frame to accommodate pipes of various sizes.

I claim:

In a pipe reamer, a base, a hollow frame carried thereby, said frame having a threaded opening at one end, a threaded sleeve disposed in said threaded opening and provided with a hand wheel, a cylindrical rod disposed within the said sleeve and provided with a handle at one end and at the other end with a head having a socket, a reaming tool having a shank adapted to enter and to be held in said socket, said reaming tool being disposed within said hollow frame, a ball bearing washer disposed between said head and the end of said threaded sleeve, a series of radially disposed centering screws carried by said hollow frame at the end opposite the threaded opening, a cylindrical collar provided with radial slots adapted to enter the end of said hollow frame, said slots being adapted to straddle said centering screws, and a spring pin carried by said hollow frame and arranged to engage said collar for holding the latter in position.

DELBERT M. HATTON.

Witnesses:
CARSON DUFFEY,
J. C. DUFFEY.